US012062990B2

(12) United States Patent
Barthold et al.

(10) Patent No.: US 12,062,990 B2
(45) Date of Patent: Aug. 13, 2024

(54) STEP-WISE POWER TRANSFORMATION

(71) Applicants: Electranix Corporation, Winnipeg (CA); Lionel Barthold, Queensbury, NY (US)

(72) Inventors: Lionel O. Barthold, Queensbury, NY (US); Dennis A. Woodford, Winnipeg (CA)

(73) Assignees: Lionel O. Barthold, Queensbury, NY (US); Electranix Corporation, Winnipeg (CA)

( * ) Notice: Subject to any disclaimer, the term of this patent is extended or adjusted under 35 U.S.C. 154(b) by 302 days.

(21) Appl. No.: 17/670,245

(22) Filed: Feb. 11, 2022

(65) Prior Publication Data
US 2022/0166334 A1 May 26, 2022

Related U.S. Application Data

(63) Continuation of application No. PCT/US2020/045807, filed on Aug. 11, 2020.
(Continued)

(51) Int. Cl.
*H02M 5/42* (2006.01)
*H02J 3/36* (2006.01)
(Continued)

(52) U.S. Cl.
CPC ............... *H02M 5/42* (2013.01); *H02J 3/36* (2013.01); *H02M 3/158* (2013.01);
(Continued)

(58) Field of Classification Search
CPC .... H02M 5/42; H02M 7/4833; H02M 7/4835; H02M 1/007; H02M 1/4241; H02J 3/36
See application file for complete search history.

(56) References Cited

U.S. PATENT DOCUMENTS

2017/0250617 A1* 8/2017 Kondo ............... H02M 3/1588
2018/0166983 A1* 6/2018 Barthold ................ H02M 3/06
(Continued)

FOREIGN PATENT DOCUMENTS

WO 2018/157010 A1 8/2018

OTHER PUBLICATIONS

The International Preliminary Report on Patentability issued on Feb. 8, 2022 for PCT Application No. PCT/US2020/045807.

Primary Examiner — Alex Torres-Rivera
(74) Attorney, Agent, or Firm — Prince Lobel Tye LLP

(57) ABSTRACT

A system for transforming the voltage of AC electrical energy by resonant charge exchange between a first node and a second node. The system includes a capacitor or series-connected column of capacitors and a controller that is configured to cause the system to repetitively conduct a primary charge exchange by resonantly exchanging energy between the capacitor or the series-connected column of capacitors and the first node, and then electrically isolate the capacitor or the series-connected column of capacitors. During the electrical isolation the system can electrically reconfigure the series-connected column of capacitors. The system then conducts a secondary charge exchange by resonantly exchanging energy between the capacitor or the reconfigured series-connected column of capacitors and the second node.

19 Claims, 23 Drawing Sheets

Related U.S. Application Data

(60) Provisional application No. 62/885,275, filed on Aug. 11, 2019.

(51) Int. Cl.
    *H02M 3/158*     (2006.01)
    *H02M 7/483*     (2007.01)
    *H02M 1/00*     (2006.01)

(52) U.S. Cl.
    CPC ....... *H02M 7/4833* (2021.05); *H02M 7/4835* (2021.05); *H02M 1/0095* (2021.05)

(56) References Cited

U.S. PATENT DOCUMENTS

| | | | |
|---|---|---|---|
| 2020/0201953 A1* | 6/2020 | Shi | G06F 30/367 |
| 2021/0021129 A1* | 1/2021 | Fujisawa | H02M 5/458 |

* cited by examiner

STEP-WISE POWER TRANSFORMATION

CROSS-REFERENCE TO RELATED APPLICATIONS

This application claims priority of International Application PCT/US2020/045807 filed on Aug. 11, 2020, which itself claimed priority of Provisional Patent Application 62/885,275 filed on Aug. 11, 2019. The entire contents of both of these priority applications are incorporated herein by reference for all purposes.

FIELD

This disclosure pertains to transformation of electric power from one voltage to another in short incremental steps by means of capacitive energy exchanges.

BACKGROUND

Early in the history of electric power systems, the introduction of a magnetically based transformer forced early direct-current systems to give way to alternating current systems in which generator output voltage could be converted to higher voltages, and proportionately lower currents, for long distance delivery. Today's power systems transform generated power to transmission networks operating at hundreds of kilovolts and spanning hundreds of miles. While magnetically-based transformers serve principally to link power transmission and distribution systems of differing voltage levels, specially-built transformers can also shift electrical phase angle from one high voltage bus to another, thereby forcing an increase or decrease in power transfer between them.

DESCRIPTION OF PRIOR ART

Transformer technology advanced very quickly over the first decades of power grid evolution. Transformers linking differing power delivery voltage levels consist of large cores of special-purpose laminated steel, around which are windings of insulated copper wire—all immersed in a special insulating oil. While today's magnetically-based transformers are efficient and reliable, their long delivery lead time often requires that a spare transformer be readily available on site. Furthermore, they are based on a very mature technology with little promise of further advances.

Their insulating oil is toxic, their cost increases year-by-year, and their technology base is quite mature.

Though AC was universally adopted in the 1920s, a first special-purpose high voltage DC transmission link was introduced in 1954, wherein AC power was magnetically transformed to a high AC voltage then converted to high voltage DC for delivery to a remote location where it was re-converted to AC for linking to the local AC network. DC had the advantage of low-cost towers, the electrical capability of very long-distance transfer, and the capability of controlled power flow.

The mercury arc valves used in the earliest AC-to-DC converter stations were soon displaced by solid state valves having lower cost and greater reliability. As the use of DC links increased, valve design improved and a new method of commutation was introduced; one capable of generating reactive power rather than being required to consume it. High Voltage DC (HVDC) projects now abound throughout the world for special purpose, point-to-point transmission tasks but, for lack of suitably priced high voltage DC circuit breakers compared to high voltage AC circuit breakers, are not cost effective for forming networks similar to those characterizing high voltage AC systems.

Meanwhile, the realization of global climate change triggered a major shift in generation sources, principally to wind and solar sites. This shift will change the role of today's transmission systems by imposing geographically broad weather-related irregularities in energy production capability. The solution to that shift was recognized to be construction of a geographically broad HVDC "supergrid," overlaying today's AC transmission system. But it was also acknowledged that in order for HVDC to operate as a network, rather than a point-to-point expedient, the DC equivalent of the AC transformer had to be invented. Thus, began multiple investigations on how to transform between two high voltage DC systems.

One DC transformer (DCT), consisting of a column of capacitors, is disclosed in U.S. Pat. No. 10,284,080 B2, the disclosure of which is incorporated herein by reference in its entirety.

SUMMARY

This disclosure achieves exchange of energy between multiple electrical nodes by a high-speed, repeating three step process, the first step being a resonant half-cycle exchange of energy between a first voltage node and a column of series-connected capacitors, the second being electrical reconfiguration of capacitors within the series-connected column, and the third being a resonant half-cycle exchange of energy between the reconfigured column and one or more secondary nodes.

The disclosure will serve to replace existing magnetically-based AC transformers, offering the advantages of (1) internal redundancy sufficient to obviate the need for the spare transformer normally supplied with magnetic transformation, (2) absence of toxic insulating oil, (3) ease of manufacture, being modular in construction, (4) inherent phase shifting capability, and (5) the ability to convert between primary and secondary nodes differing in frequency and/or wave-shape.

The foregoing is accomplished through use of a controller which translates prescribed transformation functions into the selection of both the active number and connection polarity of multiple series-connected capacitive modules which, in the aggregate, (1) resonantly receive electrical charge from a primary node (2) are electrically reconfigured and (3) deliver electrical charge to one or more secondary nodes.

All examples and features mentioned below can be combined in any technically possible way.

In one aspect, a computer program product has a non-transitory computer-readable medium including computer program logic encoded thereon that, when performed on a system for transforming the voltage of AC electrical energy between multiple electrical nodes, causes energy exchange between the multiple electrical nodes in a series of discrete, short increments of time.

Some examples include one of the above and/or below features, or any combination thereof. In some examples energy transformation is achieved by resonant charge exchange between a first electrical node, a capacitor or series-connected column of capacitors, and a second electrical node, and the computer program product causes the system to repetitively conduct a primary charge exchange by resonantly exchanging energy between the capacitor or the series-connected column of capacitors and the first node, and then electrically isolate the capacitor or the series-connected column of capacitors, during the electrical isolation electrically reconfigure the series-connected column of capacitors, and then conduct a secondary charge exchange by resonantly exchanging energy between the capacitor or the reconfigured series-connected column of capacitors and the second node. In an example the computer program product further causes the system to determine the manner of capacitor reconfiguration during the interval between primary and secondary charge exchanges. In an example the computer program product further causes the system to leave all of the capacitors of the series-connected column of capacitors with equal charge following charge exchange with the secondary node.

Some examples include one of the above and/or below features, or any combination thereof. In an example the capacitor or series-connected column of capacitors is sized to allow the instantaneous input voltage profile and output voltage profile to differ by its temporary storage of energy. In an example the system further comprises a smoothing capacitor electrically connected between each node and ground, to smooth both input and output waveforms. In an example the smoothing capacitors also participate in the resonant energy exchange for the input and output waveforms. In an example multiple, parallel, series-connected columns of capacitors are controlled to accomplish resonant energy exchange equally offset in time from each other, to produce smoother input and output voltage profiles.

Some examples include one of the above and/or below features, or any combination thereof. In an example the series-connected column of capacitors is divided into multiple unequal sections such that, after all sections are charged in series by one node, one or more sections are then reconfigured in voltage opposition to the other sections before connection to another node, to produce a secondary voltage equal to the difference in two section voltages. In an example the series-connected column of capacitors is divided into multiple series-connected sections such that the sections can be charged from a first node in series, after which their series connection can be configured to serve one secondary node and their intermediate connection can be configured to serve another secondary node. In an example the computer program product further causes the system to connect a capacitor to affect a resonant energy exchange with a first node, then disconnected and resonantly connected to a larger capacitor, leaving the larger capacitor and the node to which it is connected with a voltage lower than the voltage of the first node.

In another aspect a system for transforming the voltage of AC electrical energy by resonant charge exchange between a first node and a second node includes a capacitor or series-connected column of capacitors and a controller that is configured to cause the system to repetitively conduct a primary charge exchange by resonantly exchanging energy between the capacitor or the series-connected column of capacitors and the first node and then electrically isolate the capacitor or the series-connected column of capacitors, during the electrical isolation electrically reconfigure the series-connected column of capacitors, and then conduct a secondary charge exchange by resonantly exchanging energy between the capacitor or the reconfigured series-connected column of capacitors and the second node.

Some examples include one of the above and/or below features, or any combination thereof. In an example the controller further causes the system to determine the manner of capacitor reconfiguration during the interval between primary and secondary charge exchanges. In an example the controller further causes the system to leave all of the capacitors of the series-connected column of capacitors with equal charge following charge exchange with the secondary node. In an example the capacitor or series-connected column of capacitors is sized to allow the instantaneous input voltage profile and output voltage profile to differ by its temporary storage of energy.

Some examples include one of the above and/or below features, or any combination thereof. In an example the system further comprises a smoothing capacitor electrically connected between each node and ground, to smooth both input and output waveforms. In an example the smoothing capacitors also participate in the resonant energy exchange for the input and output waveforms. In an example the system comprises multiple, parallel, series-connected columns of capacitors that are controlled to accomplish resonant energy exchange equally offset in time from each other, to produce smoother input and output voltage profiles.

Some examples include one of the above and/or below features, or any combination thereof. In an example the series-connected column of capacitors is divided into multiple unequal sections such that, after all sections are charged in series by one node, one or more sections are then reconfigured in voltage opposition to the other sections before connection to another node, to produce a secondary voltage equal to the difference in two section voltages. In an example the series-connected column of capacitors is divided into multiple series-connected sections such that the sections can be charged from a first node in series, after which their series connection can be configured to serve one secondary node and their intermediate connection can be configured to serve another secondary node. In an example the controller further causes the system to connect a capacitor to affect a resonant energy exchange with a first node, then disconnected and resonantly connected to a larger capacitor, leaving the larger capacitor and the node to which it is connected with a voltage lower than the voltage of the first node.

EMBODIMENTS

To simplify explanation of the embodiments cited herein, commonly used power electronic switching devices such as thyristors, insulated gate bipolar transistors (IGBTs) and diodes that may be silicon, silicon carbide or other semiconductor-based switching devices are all represented herein by simple switch symbols, their function being made clear from the context of the figures presented. The more general identification of "nodes" will, in higher voltage power applications, correspond to "busses" in such applications. Also, to simplify explanations, the same numbers are sometimes used in multiple drawings to refer to the same element, and such elements are not necessarily discussed in conjunction with each drawing in which they are present.

Embodiments cited herein are based on electrical charge transfers between electrical nodes by means of intermediate transfer into and out of a series-connected column of capacitors, each such intermediate transfer being made to have a sinusoidal wave shape by placing an inductance in series with the switching device affecting such transfer. This sinusoidal wave shape with its resulting current zero facilitates the interruption at that point in time by power electronic switching devices, e.g. thyristors or solid-state bidirectional switches, leaving the capacitor(s) with either an increase or decrease in charge and a corresponding higher or lower voltage. The principles of such resonant transfers are well known to those versed in the art.

Figure 1:
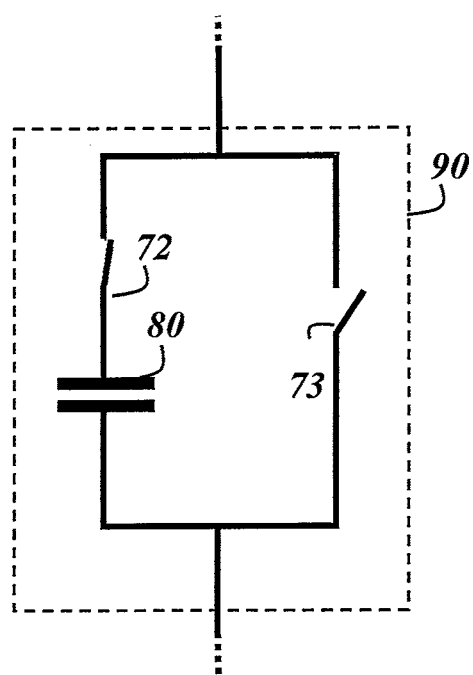
FIG. 1 illustrates a prior art "half bridge" with switches adjusted to electrically insert its capacitor into a series of capacitors.
Figure 2:
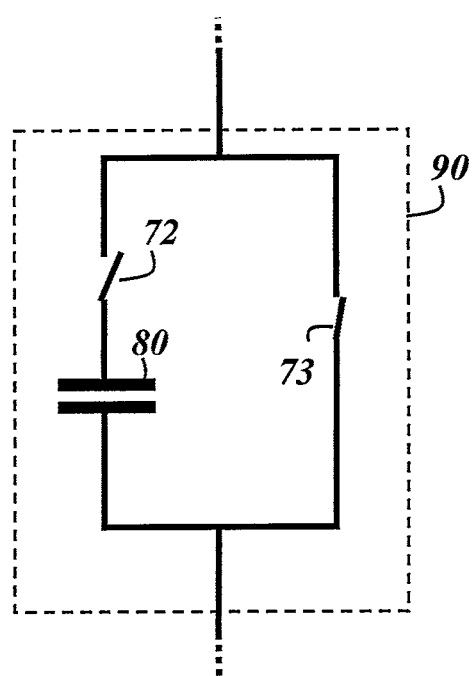
FIG. 2 illustrates a prior art "half bridge" with switches adjusted to remove its capacitor from a series of capacitors and bypass it in that series.

Usefulness in application of the above principles is enhanced in the embodiments cited herein by providing a means, as shown in FIG. 1, to electrically bypass individual capacitors 80 e.g., by inserting each capacitor 80 within a half-bridge 90, thus allowing its insertion into a series column by closing of switch 72 and opening of switch 73 or electrically bypasses the capacitor 80 by opening switch 72 and closing switch 73 as shown in FIG. 2.

Figure 3:
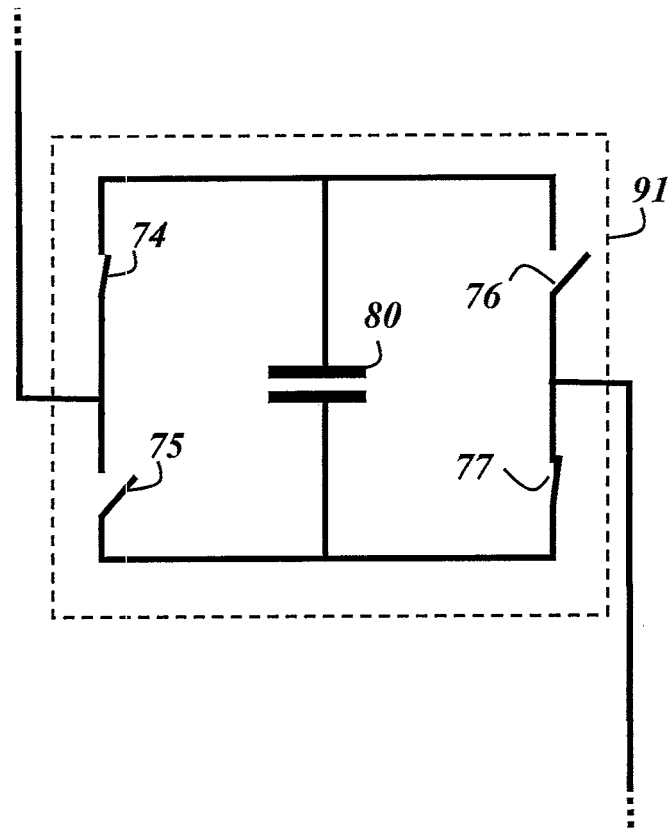
FIG. 3 illustrates a prior art "full bridge" with switches adjusted to insert a capacitor into a series chain of capacitors.
Figure 4:
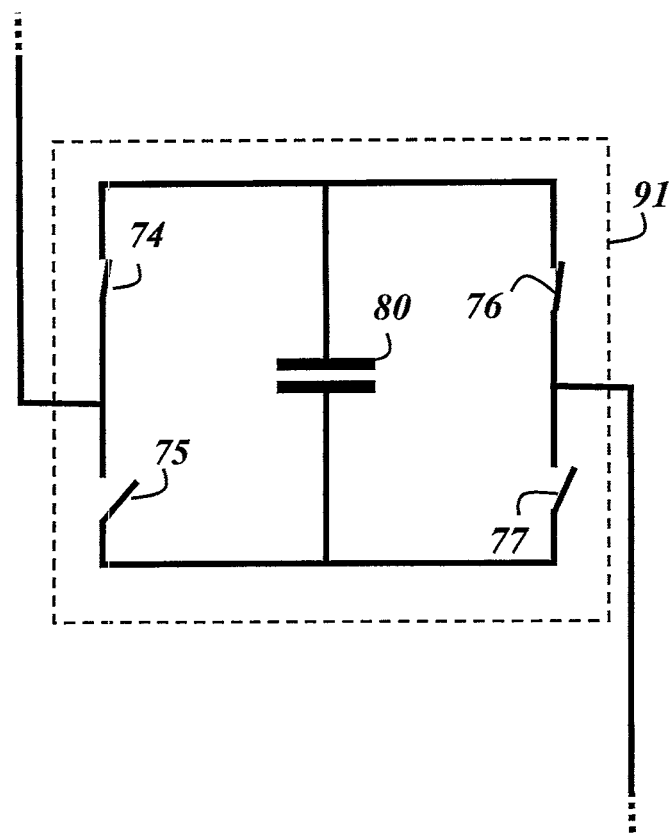
FIG. 4 illustrates a prior art "full bridge" with switches adjusted to remove a capacitor from a series chain of capacitors and electrically bypass it in that series.
Figure 5:
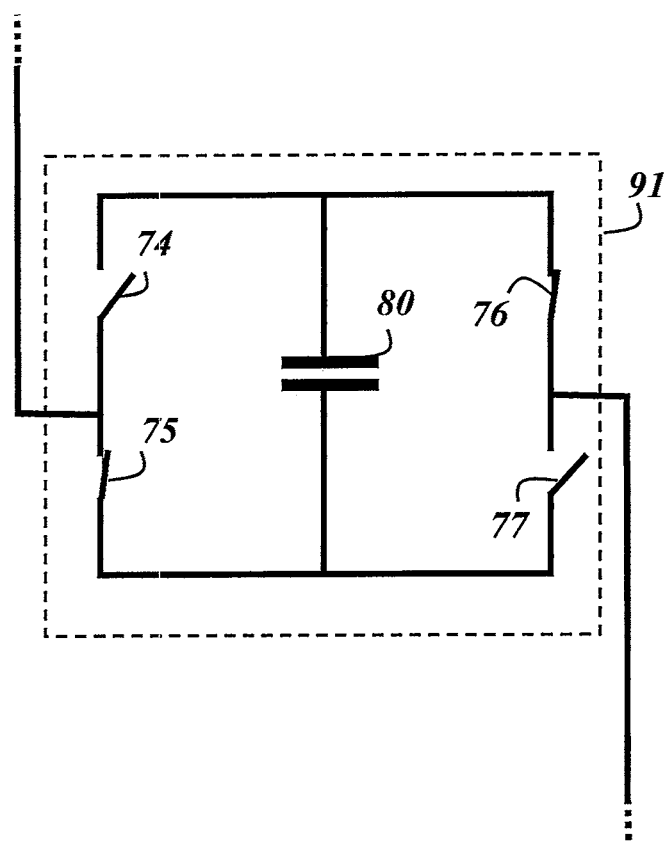
FIG. 5 illustrates a prior art "full bridge" with switches adjusted to insert a capacitor into a series chain of capacitors with its connection polarity reversed.

Alternatively, a full bridge 91 as shown in FIG. 3 allows either (1) inserting the capacitor 80 into the column in its original orientation by closing switches 74 and 77 while opening switches 75 and 76, (2) isolating and by-passing the capacitor 80 by closing switches 74 and 76 while opening switches 75 and 77 as shown in FIG. 4, or (3) inserting the capacitor 80 into the column 100 with its electrical polarity reversed by closing switches 75 and 76 and opening switches 74 and 77 as shown in FIG. 5.

In both figures and text describing various embodiments of this disclosure, various nodes are, for ease of understanding, referred to as "primary nodes" or "secondary nodes." It will be apparent to those versed in the art that all embodiments are bilateral and will allow nodes identified as secondary nodes to function as primary nodes and those identified as primary nodes to serve as secondary nodes.

Figure 6:
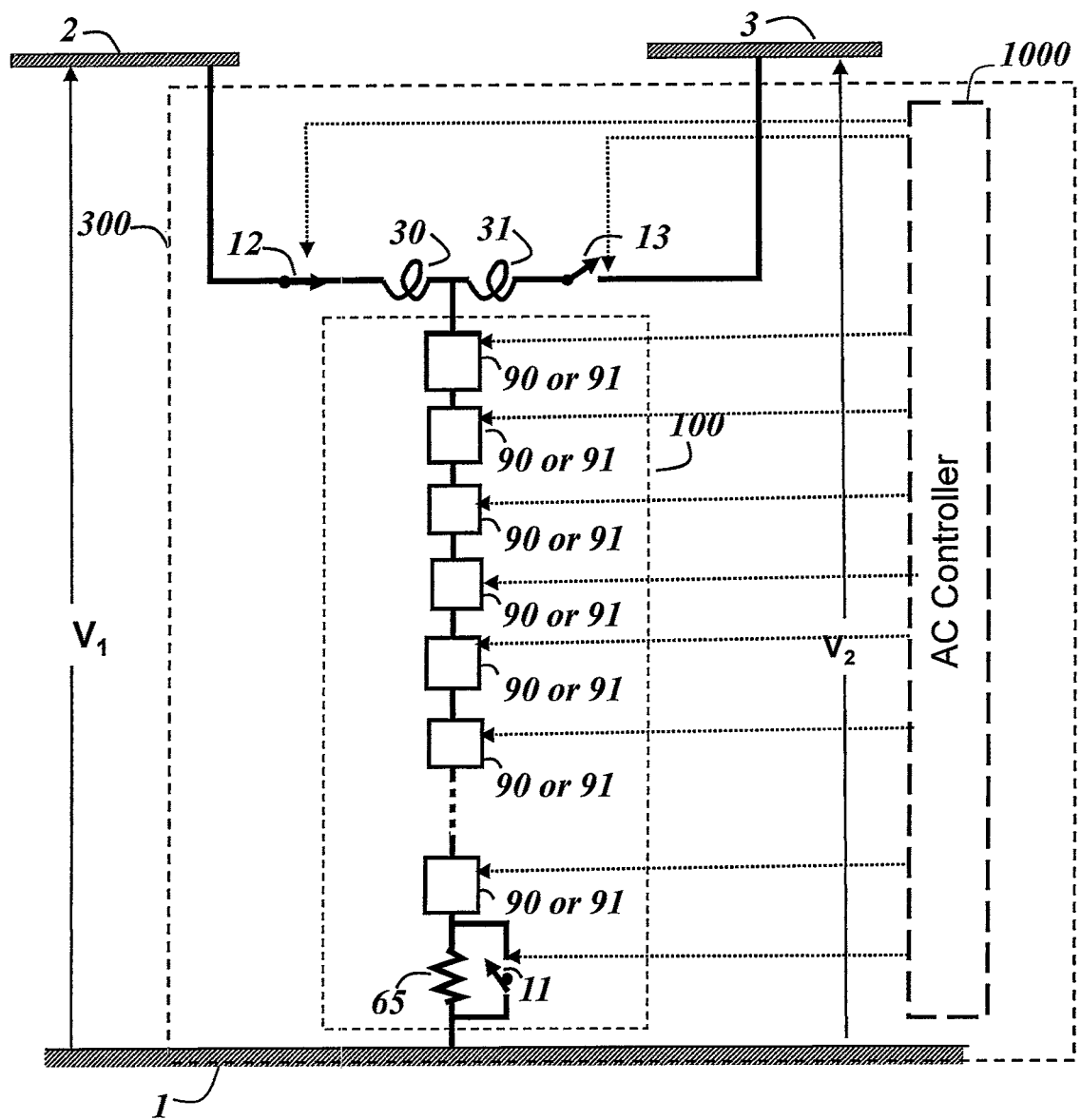
FIG. 6 illustrates a series-connected column of capacitors connected to resonantly exchange charge with the first of two electrical nodes
Figure 7:
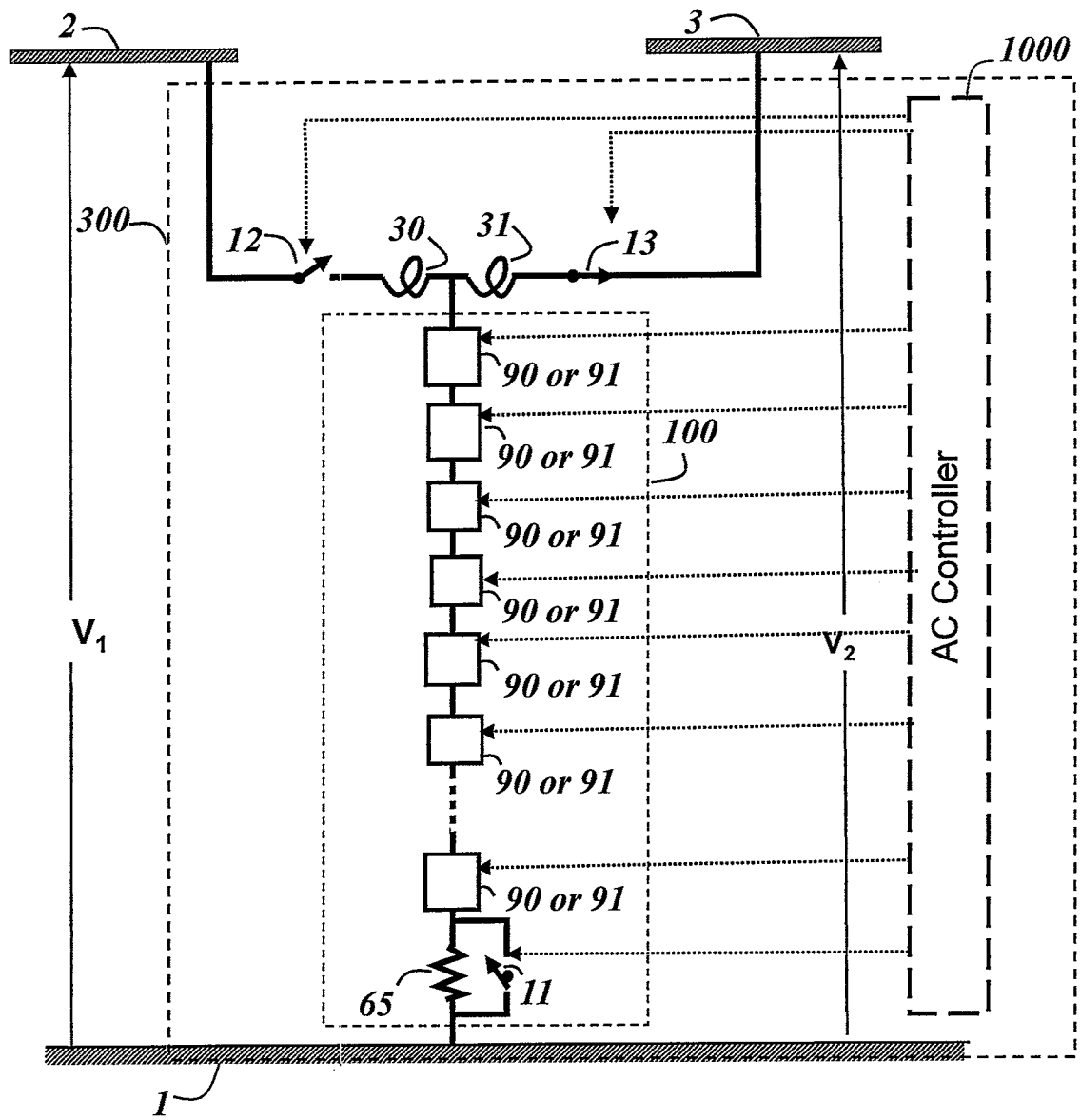
FIG. 7 illustrates the series-connected column of capacitors of FIG. 6 after disconnection from the first of two electrical nodes, reconfiguration of capacitors comprising the column of capacitors, and connected for resonant exchange of charge with a second electrical node.

FIG. 6 shows the first embodiment of the present stepwise power transformation system 300, capable of transforming energy from one voltage to another voltage by means of a series of short resonant charge exchanges, each of which may be at a progressively higher or lower voltage, e.g. describing a sinusoidal profile wherein, for each such exchange, a column 100 of half-bridge or full-bridge capacitive modules 90 or 91 is first made to exchange charge resonantly with the primary node 2 at its instantaneous voltage and polarity by closure of switch 12 in FIG. 6, that resonant exchange being interrupted at its first current zero through node 1 which is represented as ground in this and subsequent embodiments. During that connection, the resonant frequency of the half-sine wave exchange is determined by a reactor 30 and the effective capacitance of the column 100, that capacitance resulting from series connection of most or all capacitive modules 90 or 91 within the column 100 and any component such as a filter (not shown in this figure) or capacitor (not shown in this figure) connected between node 2 and ground. After such charge exchange with node 2, switch 12 is opened and the column 100 momentarily isolated, during which isolation, capacitors 80 within various modules 90 or 91 can be individually isolated and bypassed, left to be included in the column 100 at their original polarity, or removed and then re-inserted into the series column 100 with their polarity reversed. The new voltage of column 100 then establishes the basis for second resonant charge exchange, again interrupted at its first current zero, between the reconfigured column 100 and the secondary node 3, initiated by closure of switch 13 as illustrated in FIG. 7. In the latter case the resonant frequency of the charge exchange is determined by the reactance of a second reactor 31 and the effective capacitive of the reconfigured capacitive column 100 and any component such as a filter (not shown in this figure) or capacitor (not shown in this figure) connected to node 3 and ground. An ongoing repetition of the foregoing three-step switching cycle may be made either with the same secondary column 100 reconfiguration from one cycle to the next, thus causing the secondary node 3 voltage profile to track the voltage profile of the primary node 2 or by changing the capacitor column 100 reconfiguration from one discharge cycle to the next, causing the secondary node 3 voltage profile to differ from the primary node 2 voltage profile. It will be apparent that any difference between input and output voltage profile will imply energy storage within the capacitive column 100.

Switching logic, supplied by an AC controller 1000 in FIGS. 6 and 7, controls the opening and closing timing of switches 11, 12, and 13 in those figures as well as the logic for any or all of (1) electrically bypassing certain capacitors 80 within modules 90 or 91, (2) insertion of those modules 90 or 91 in the series connected column 100 with capacitors 80 retaining their original polarity, (3) in the case of modules 80 comprise of full bridges 91, reversal of electrical polarity of the capacitor's 80 connection within the module 91 prior to re-inserting it into the column 100, or (4) opening and closing any switches in the system. That controller 1000 is implicitly included in and exhibits control in the manners as discussed relative to all embodiments later discussed but is omitted from subsequent drawings for the sake of simplicity of illustration.

If the total capacitive column 100 in FIGS. 6 and 7 is comprised of n capacitive modules 90 or 91, m of which are electrically bypassed in the interval between the charge exchange between column 100 and node 2, and its exchange with node 3, the voltage ratio $V_1/V_2$ in those figures will be n/(n−m).

Absent any corrective measure, any one such charge exchange of the column 100 with the secondary node 3 in FIG. 7, would leave m of the capacitive modules 90 or 91 with a charge level differing from that of the n-m modules that were active in the charge exchange with that secondary node 3. This charge disparity can be corrected if, during connection of the reconfigured column 100 to the secondary node 3, participation in the n-m module group is shared through internal switching so that all n capacitive modules 90 or 91 within the column 100, are left with equal charge in a process called "sorting" that is commonly used in high voltage DC to AC converter applications. It will be clear from the foregoing that the embodiment shown in FIGS. 6 and 7 can, by sorting, also cause the sum of individual n module voltages following charge exchange with the primary node 2 to be greater than the voltage of that node 2 by having available within the column 100 a number of modules 90 or 91, the sum of whose voltage ratings exceeds the maximum voltage $V_1$ on the primary node 2 and by allowing each such module 90 or 91 to share, in time, the number of modules 90 or 91 forming a voltage corresponding to the voltage of the primary node 2. It will be apparent that the designation of "primary" and "secondary" nodes in the first and subsequent embodiments is somewhat arbitrary in that any of the secondary nodes cited in this and subsequent embodiments could also serve as a primary node in the charge exchange as could any primary node serve as a secondary. Resistor 65 in FIGS. 6 and 7 is temporarily inserted into the column 100 upon initial energization of this and subsequent embodiments with all capacitive modules 90 or 91 in electrical series in order to bring the column 100, on initial energization, up to the voltage $V_1$, after which that resistor 65 is bypassed by closure of switch 11 and kept isolated for normal operation. For simplicity, this resistor 65 and its bypass switch 11 are omitted in subsequent figures.

Figure 8:
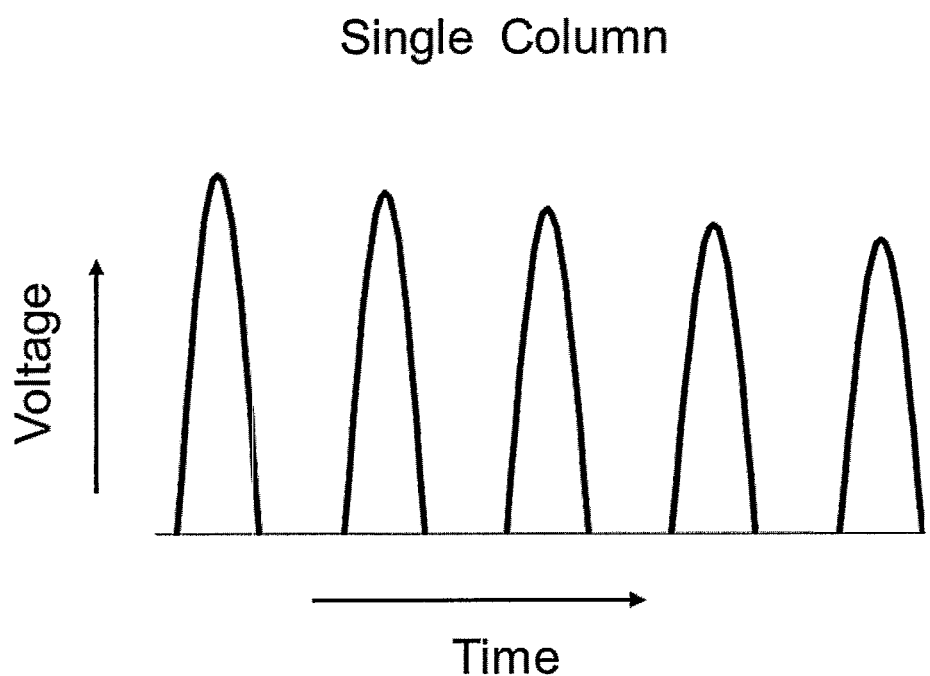
FIG. 8 shows the wave form of both primary and secondary currents resulting from alternate exchange of charge of a capacitive column first to one AC electrical node and then another AC electrical node.
Figure 9:
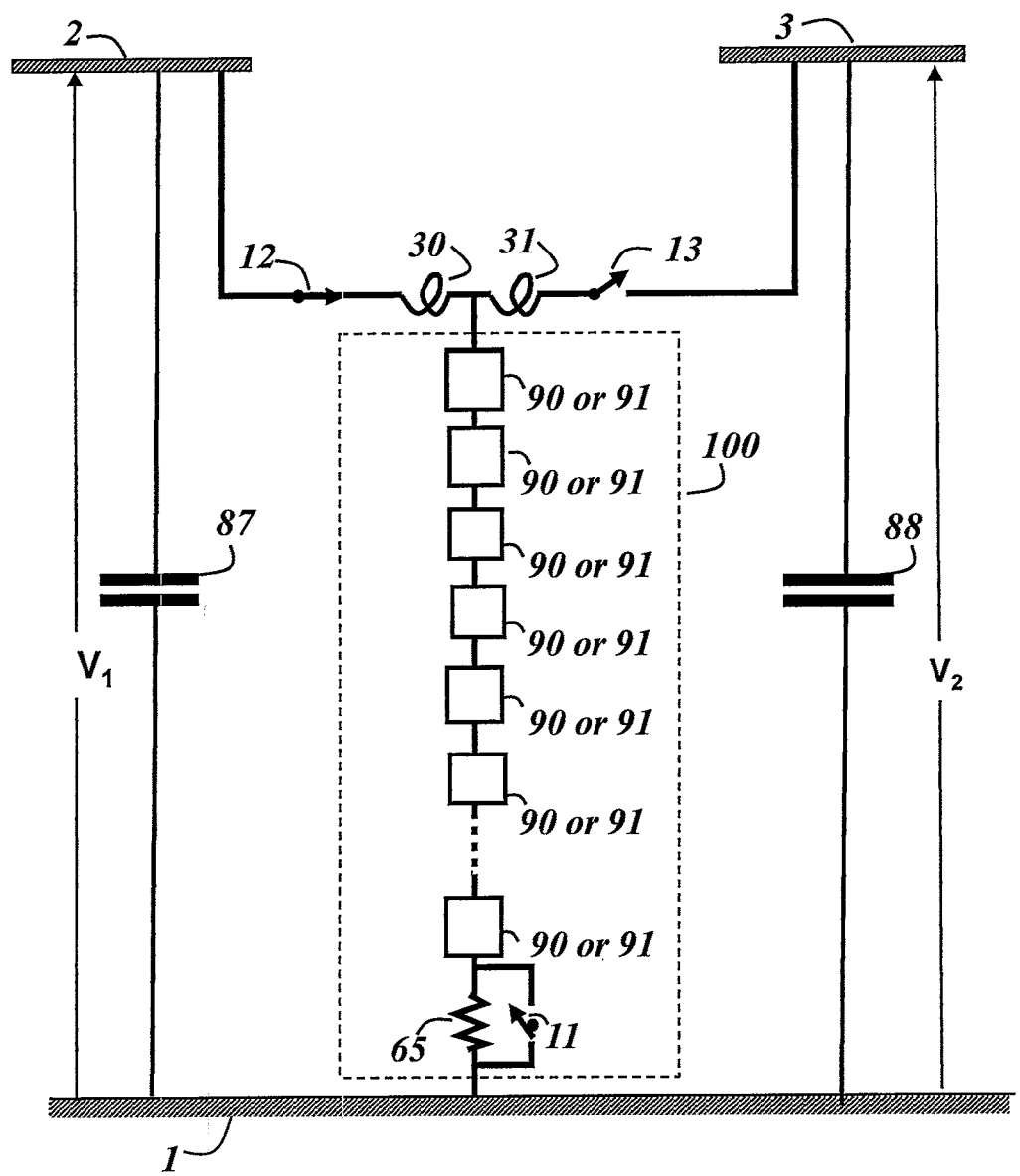
FIG. 9 shows, for a primary connection, a means of partially smoothing the output of the single-column embodiment of FIG. 7 and participate in the resonant charging and discharging.
Figure 10:
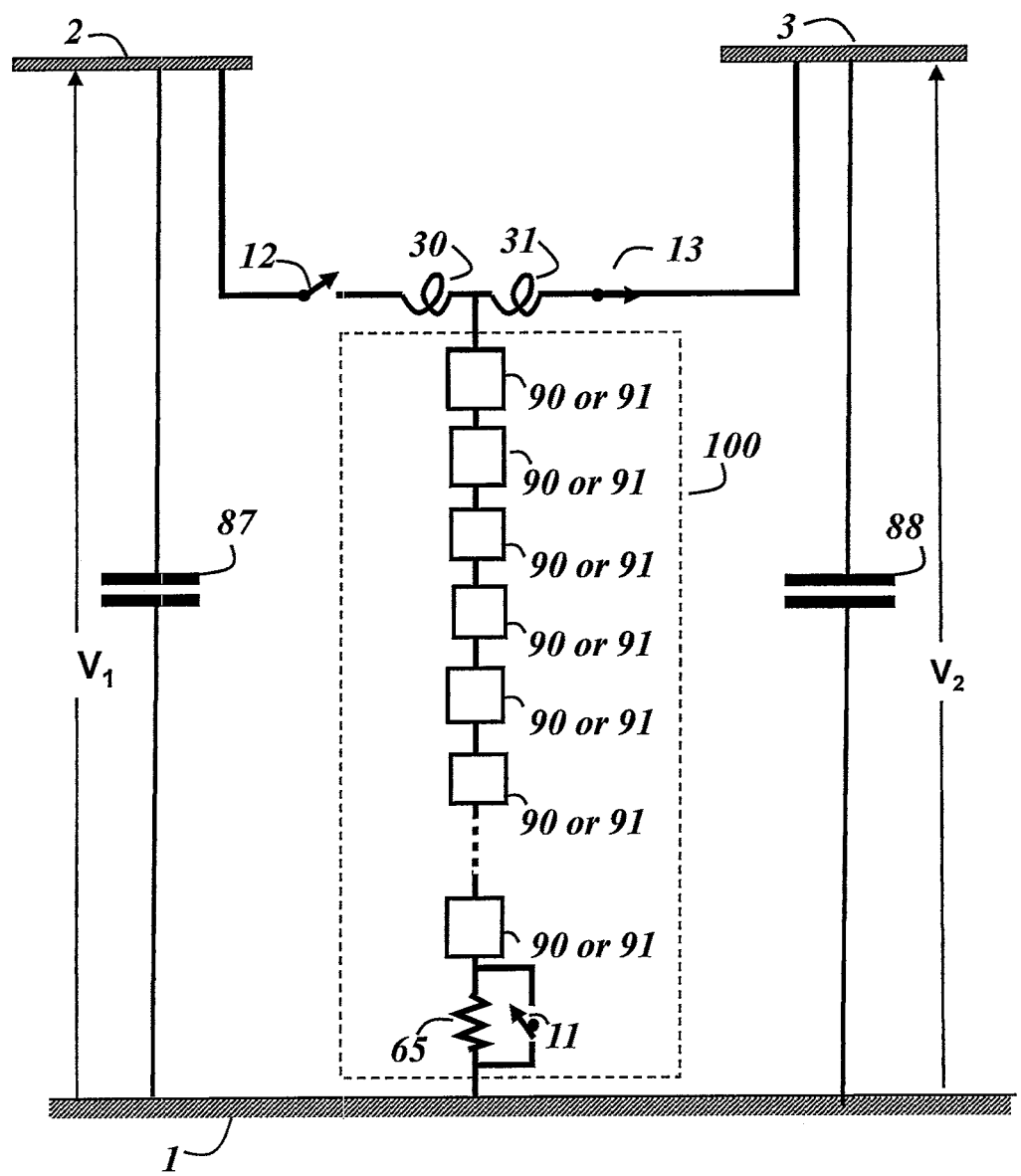
FIG. 10 shows, for a secondary connection, a means of partially smoothing the output of the single-column embodiment of FIG. 7 and participate in the resonant charging and discharging.
Figure 11:
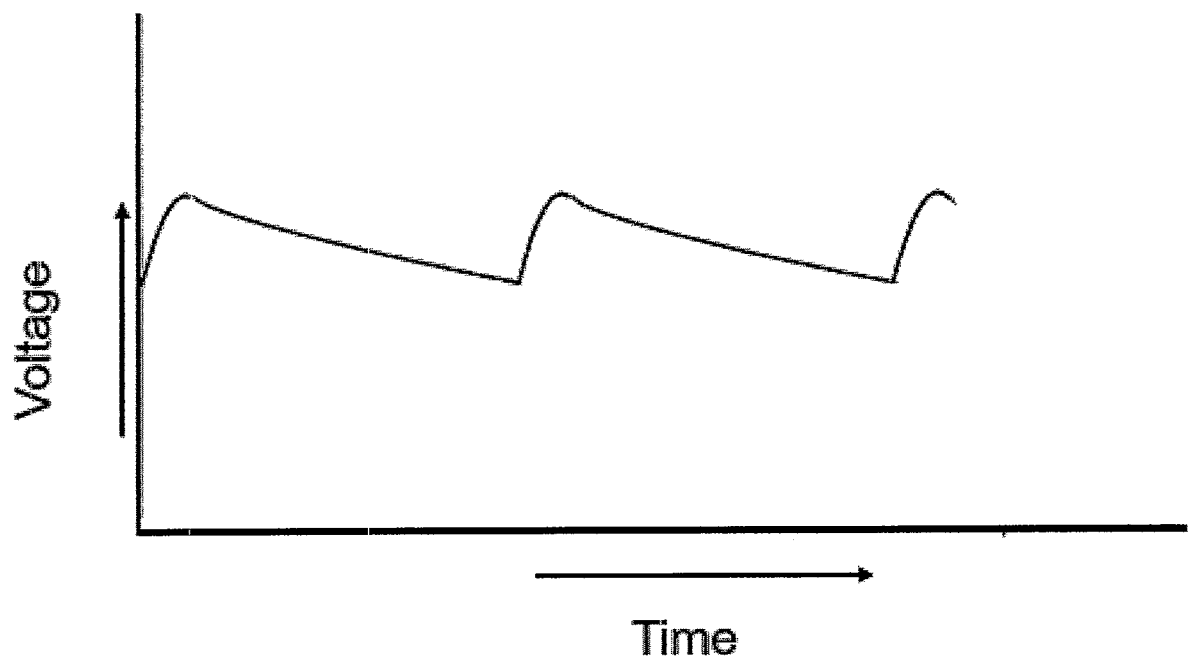
FIG. 11 shows an example waveform of input or output resulting from the smoothing effect of the smoothing capacitors used in FIGS. 9 and 10.

Both primary and secondary current wave forms resulting from the example single-column transformation embodiment shown in FIGS. 6 and 7 will be in the form of half sine wave pulses as shown in FIG. 8. The pulse duration can be but need not be at the input duration (e.g., 120 cycles per second) or otherwise. For example, each such resonant pulse can be controlled to have a duration during connection with the primary node 2 determined by the reactor 30 and the effective capacitance of all modules 90 or 91 in series and so is controllable. The duration of the subsequent half-sine wave current pulse resulting from the resonant connection of the capacitive column 100 to the secondary node 3 will be determined by the secondary reactor 31 and the capacitance of the capacitive column 100 as modified by reconfiguration between charge exchanges and so is also controllable. Accommodation of the intermittent pulse waveform resulting from such resonant exchanges, separated in both primary and secondary wave form by a zero-current interval during the period of charge exchange with the alternative node 2 or 3, will depend on the context in which this embodiment is used. Its acceptability can be enhanced by a second embodiment which employs smoothing capacitors 87 and 88 at each terminal or node, as shown in FIG. 9 in its primary connection and FIG. 10 in its secondary connection, the result of either being a waveform which, depending on the external resistive load on node 3 (not shown) would decay between cycles as shown in FIG. 11 as well as participate in the resonant energy exchanges.

Figure 12:
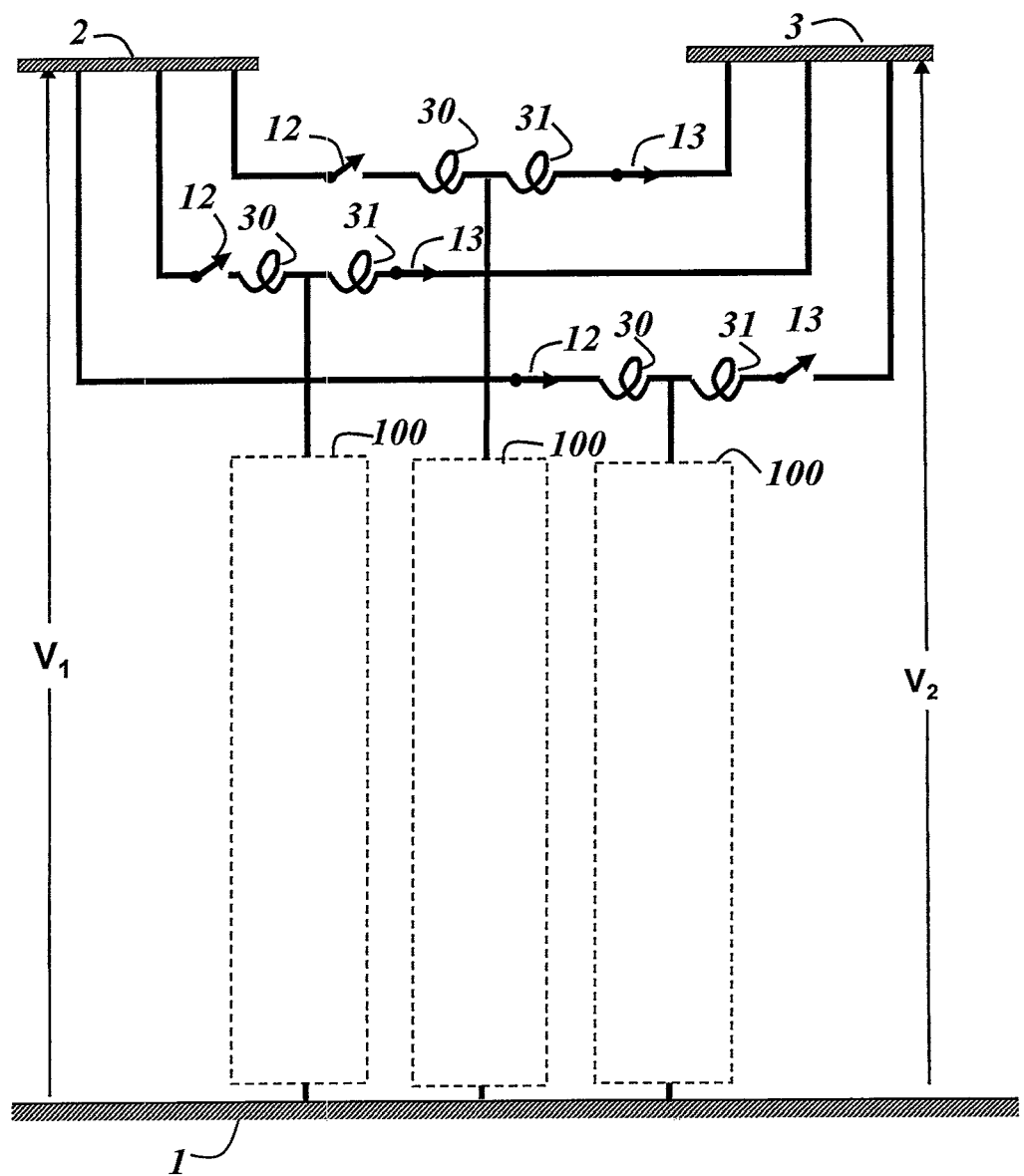
FIG. 12 shows an example use of multiple capacitive columns in parallel, operation of each offset from each other by an equal time increment.
Figure 13:
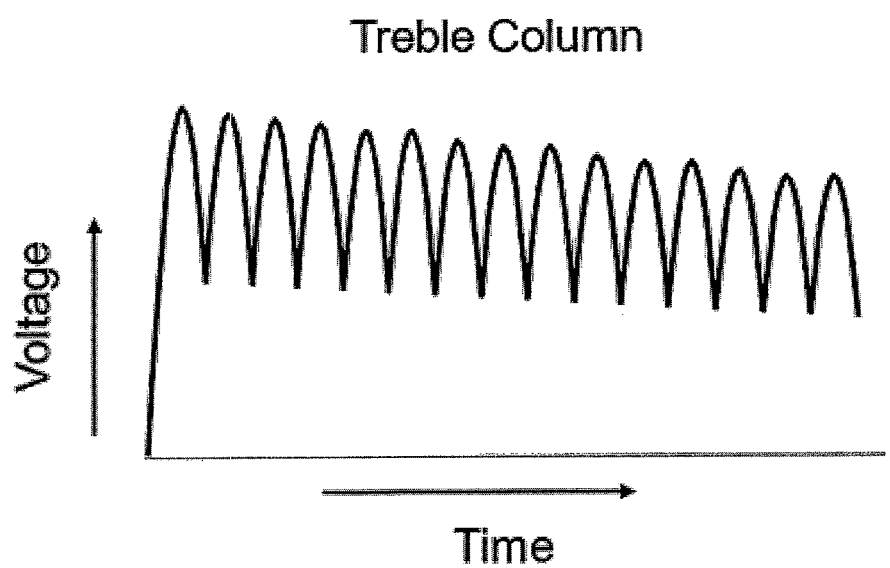
FIG. 13 shows an example waveform resulting from the use of three columns, each equally offset in timing from the other.

A third embodiment, which uses multiple, paralleled capacitive columns 100 of the first embodiment, the input and output waveforms of which are equally offset from one another in time, is shown for a three-column example in FIG. 12, the resulting input and output voltage waveforms of which are shown in FIG. 13.

The foregoing embodiments which achieve transformation through an ongoing series of very short energy pulses rather than a continuous process, can adjust the transformation voltage ratio from one very short energy exchange cycle to the next. As such, these and subsequent embodiments are capable of transforming between a primary voltage waveform that differs from the secondary waveform providing that (a) the average energy per unit time represented by the two waveforms is equal and (b) the capacitive column is capable of storing differences between momentary energy input and energy output.

It will be apparent to those versed in the art, that the foregoing embodiments will be increasingly difficult to apply as the ratio between primary and secondary voltage, $V_1/V_2$ becomes very high, as is the case in transformers stepping down to utilization voltages.

Figure 14:
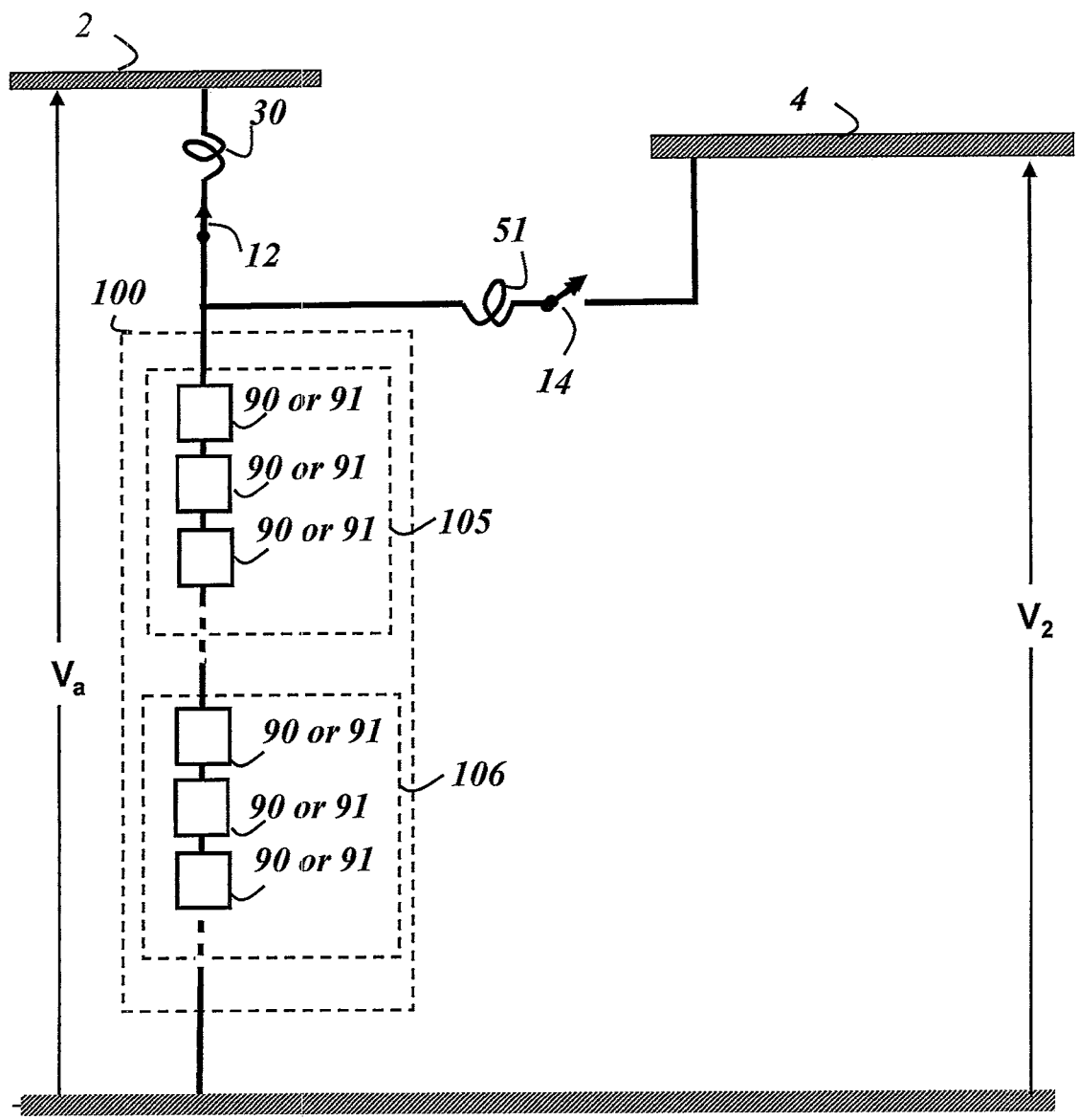
FIG. 14 shows a primary connection of a capacitive column split into two segments, enabling the two segments to be made to oppose one another during secondary connection thus producing a difference voltage.
Figure 15:
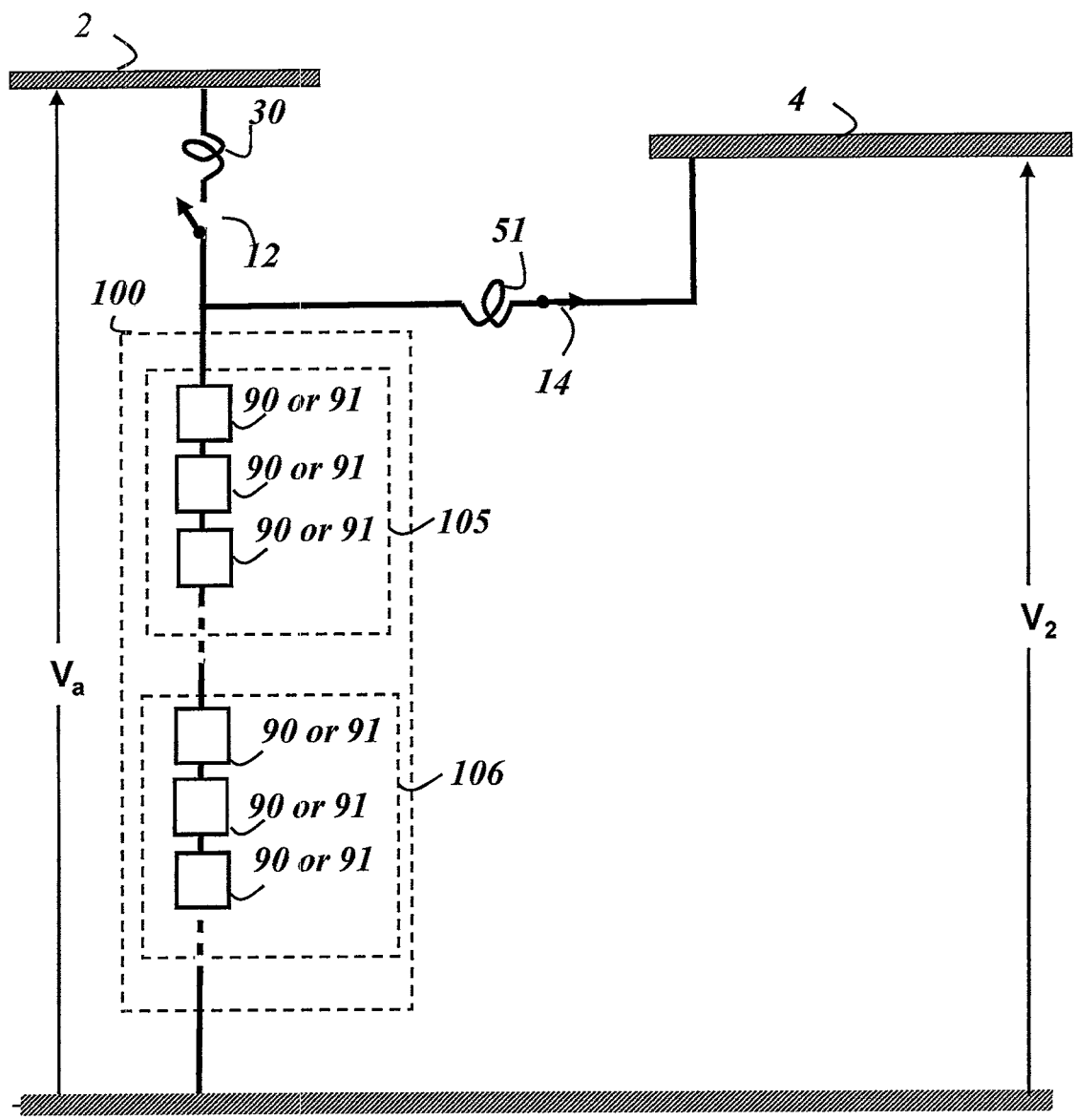
FIG. 15 shows a secondary connection of a capacitive column split into two segments, enabling the two segments to be made to oppose one another during secondary connection thus producing a difference voltage.

A fourth embodiment, illustrated in FIG. 14 for its primary connection and FIG. 15 for its secondary connection, achieves high ratio transformation by using the controller to segment the capacitive column 100 in FIG. 9 into two segments 105, 106; one with n active modules and the other with m active modules, at least one of those segments having its capacitors embedded in full bridge modules and thus capable of polarity reversal during the interval between connection to nodes 2 and 4. Thus, by charging the two column segments 105, 106 in FIGS. 14 and 15 in series and reversing only the segment with m modules prior to connection to the secondary node 4, a transformation ratio of (m+n)/(m−n) is achieved; a configuration well adopted to high ratios of primary to secondary voltage.

Figure 16:
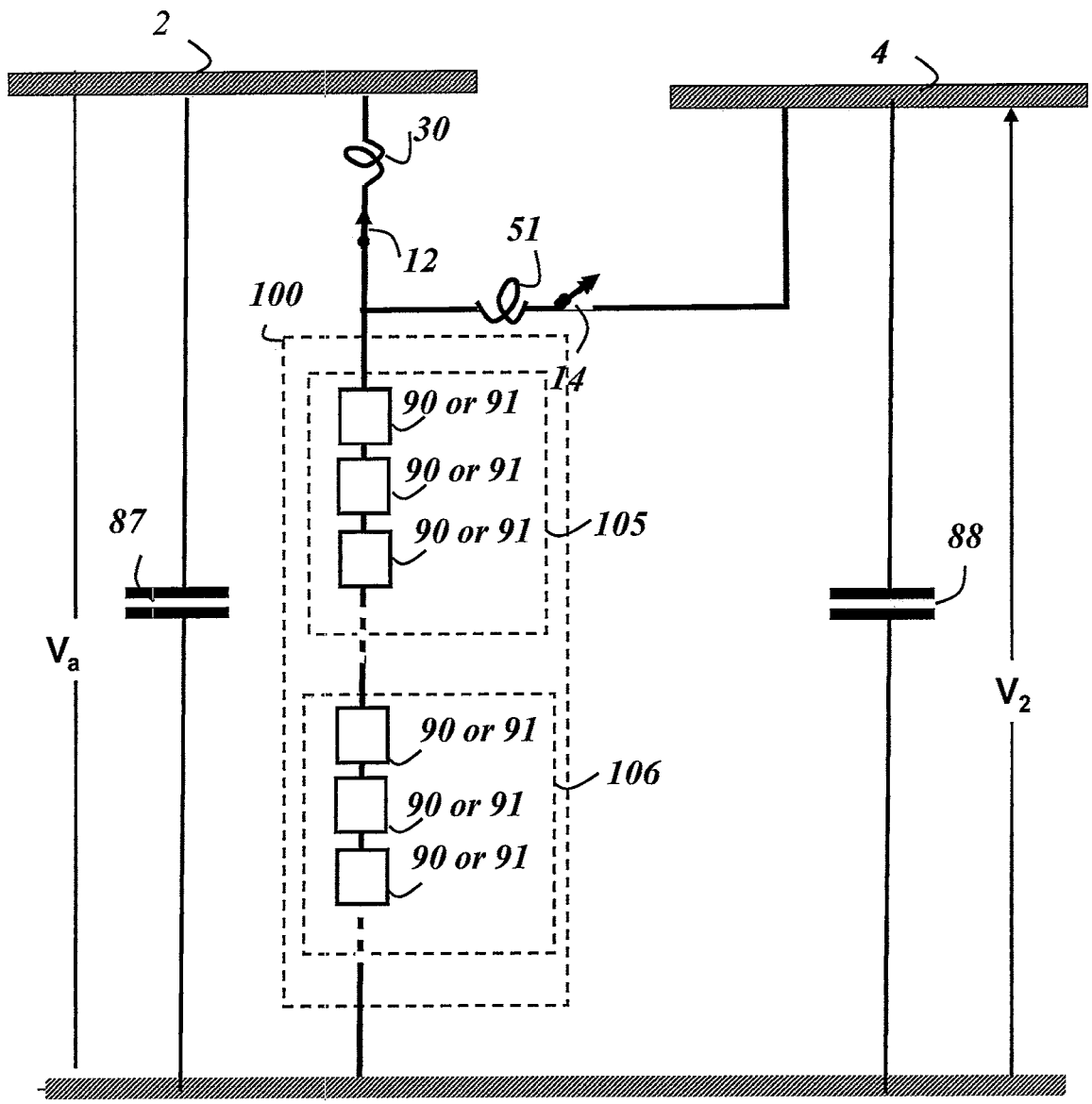
FIG. 16 shows the configuration of FIG. 14 except with smoothing capacitors at one or more terminals to smooth input and/or output voltage and participate in the resonant charging and discharging.
Figure 17:
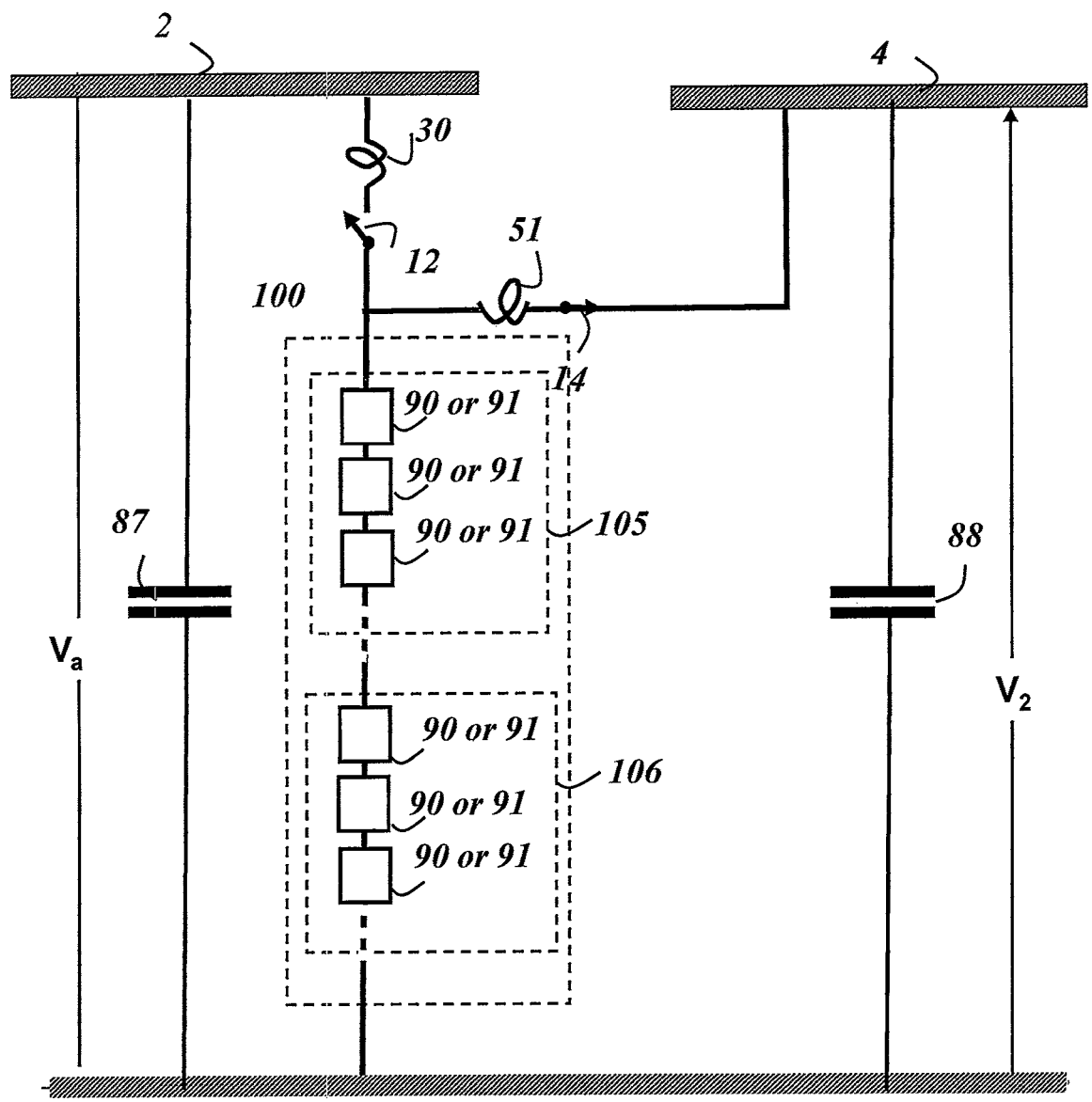
FIG. 17 shows the configuration of FIG. 15 upon connection to the transformer's secondary node except with smoothing capacitors at one or more terminals to smooth input and/or output voltage and participate in the resonant charging and discharging.

A fifth embodiment, illustrated in its primary connection in FIG. 16 and its secondary connection in FIG. 17, consists of augmenting the fourth embodiment by adding smoothing capacitor 87 to the primary node and/or smoothing capacitor 88 to the secondary node 4 to smooth the current waveform in either or both as well as participate in the resonant exchanges.

Figure 18:
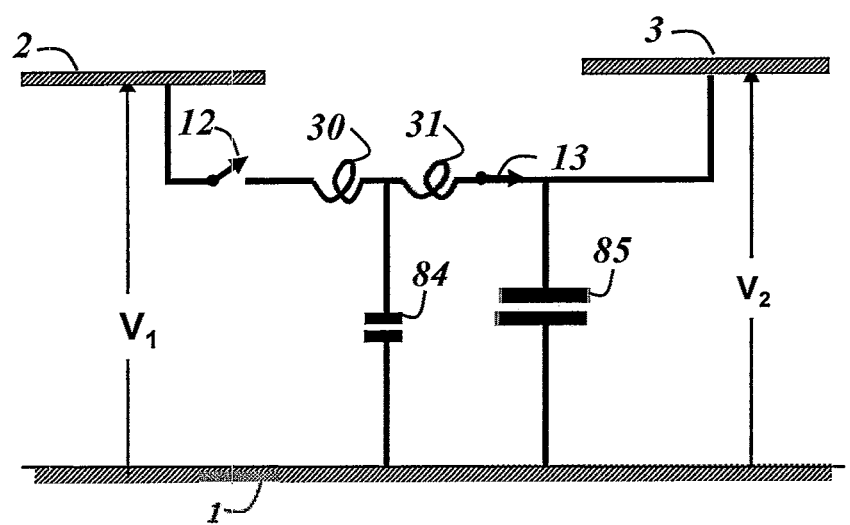
FIG. 18 shows a primary connection for a simple configuration for a large stepdown ratio based on the relative size of the capacitors so that during a secondary connect the secondary is a lower voltage.
Figure 19:
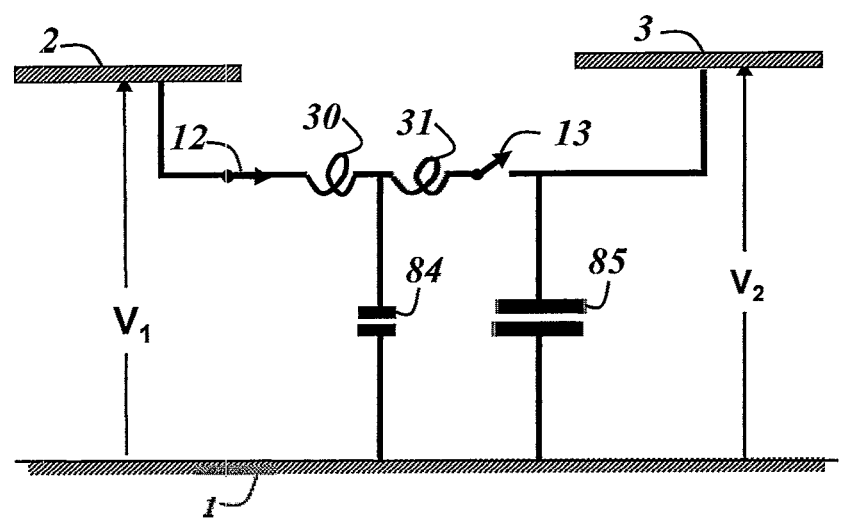
FIG. 19 shows a secondary connection for a simple configuration for a large stepdown ratio based on the relative size of the capacitors with the lower voltage connected to the secondary connection.

A sixth embodiment illustrated in FIG. 18 for its primary connection and FIG. 19 for its secondary connection achieves a high ratio transformation as presented in the fourth embodiment but with energy flow in one direction for a large voltage stepdown ratio from primary node 2 to secondary node 3. Capacitor 84 is resonantly charged through reactor 30 from node 2 with switch 12 closed and switch 13 open as shown in FIG. 18. Low voltage capacitor 85 is resonantly charged from capacitor 84 through reactor 31 in FIG. 19 with switch 12 open and switch 13 closed. The high voltage ratio from the primary connection 2 down to the secondary connection 3 is achieved by having a very large capacitance for capacitor 85 compared with the much smaller capacitance value of capacitor 84. This configuration of voltage transformer has the disadvantage compared with the fifth embodiment of unidirectional energy flow only from the high voltage primary terminal to the low voltage secondary terminal but with the advantage of a simpler configuration compared with the fifth embodiment while still applying resonant charging and discharging.

Figure 20:
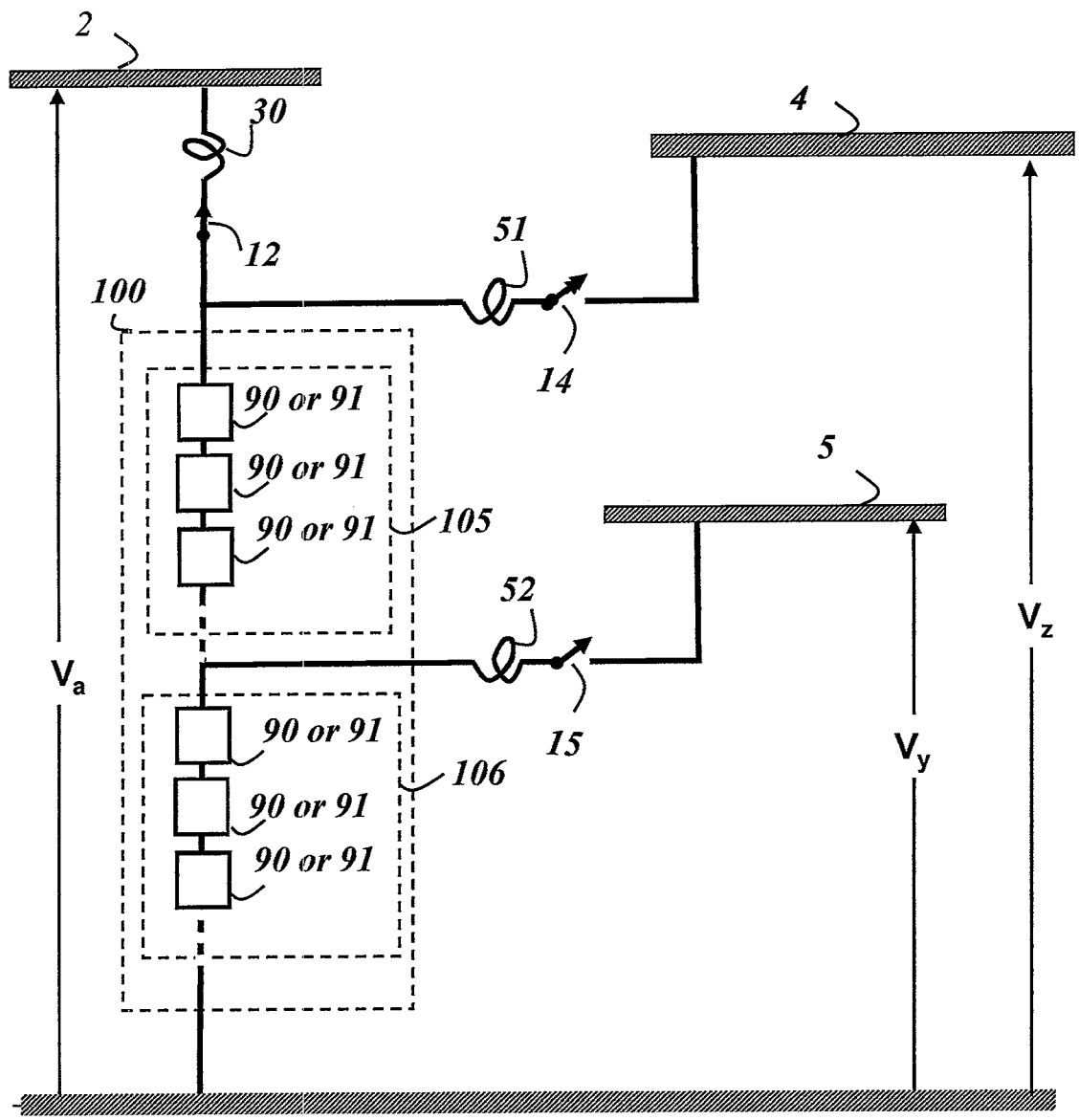
FIG. 20 shows the primary connection of a capacitive column divided into two sections to allow polarity reversal of one of those sections during secondary connect, thus supplying the secondary with a difference voltage.
Figure 21:
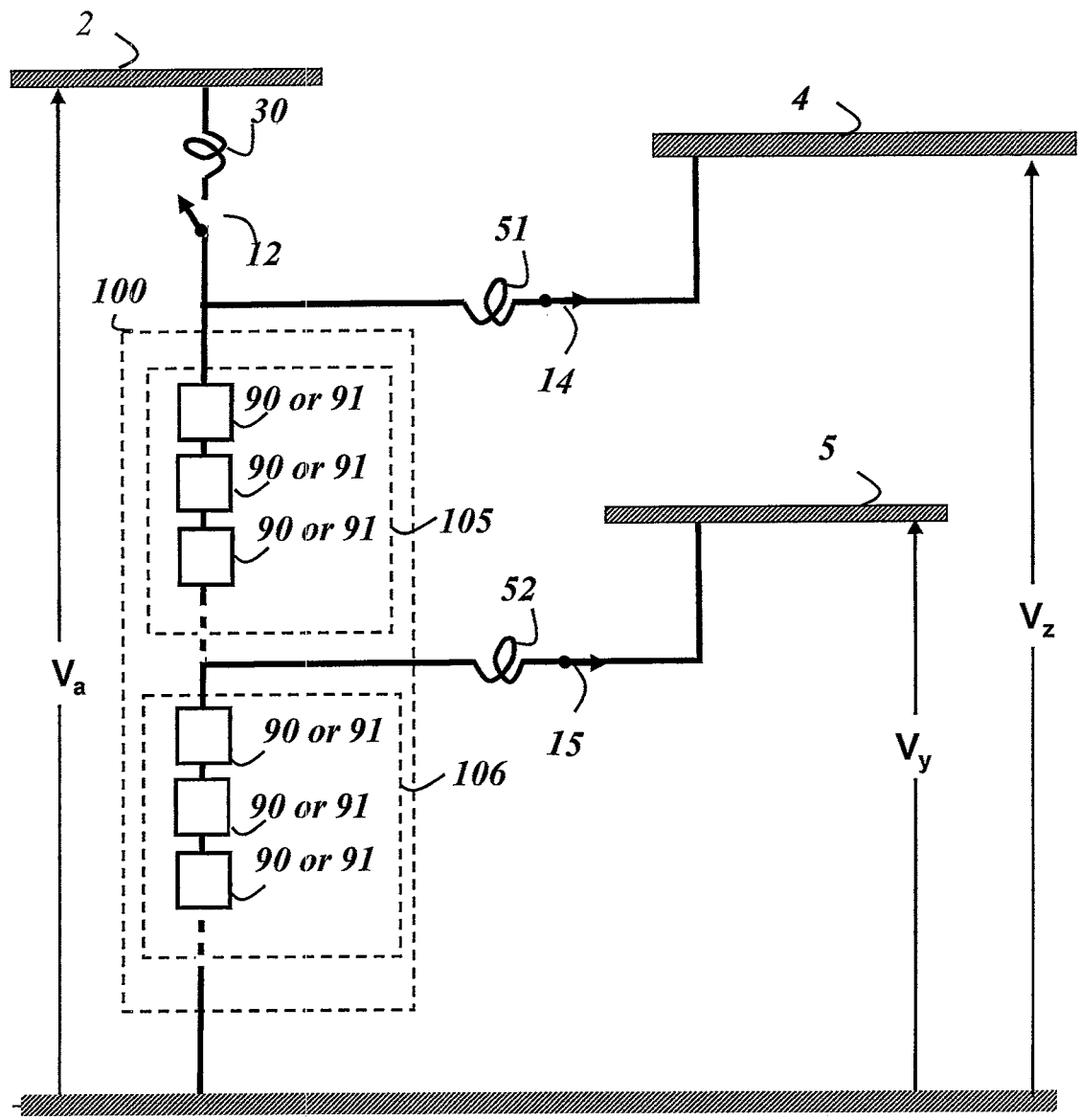
FIG. 21 shows the secondary connections of a capacitive column divided into two sections to allow polarity reversal of one section during secondary connection, thus supplying the secondary with a difference voltage.

A seventh embodiment, illustrated in its primary connection in FIG. 20 and its secondary connection in FIG. 21, consists of establishing multiple secondary nodes 4, 5, having voltages, $V_y$ and $V_z$, for the double secondary configuration illustrated in that figure. While variation in the loads on nodes 4 and 5 during the secondary charge exchanges may cause the post-discharge ratio of voltages on the two column sections 105, 106 to differ from their nominal voltage ratio, that nominal ratio can be restored during the subsequent charge exchanges with node 2 by controlling the selective bypassing of individual capacitive modules during connection to that node as within the example configurations shown in FIGS. 16 and 17.

It is also apparent, with reference to FIGS. 20 and 21, that adjustments to the susceptance within the two column sections shown 105, 106 in order to maintain voltages $V_z$ and $V_y$ at their nominal value while the external load on these nodes 4, 5 vary, will also result in changes to the frequency of the resonant exchange of energy from the capacitive column 100 to each of these nodes 4, 5 and therefor disparities in the time of opening of the associated secondary switches 14, 15. This disparity will delay the overall period of the switching cycle to the period of the slowest secondary pulse width.

Figure 22:
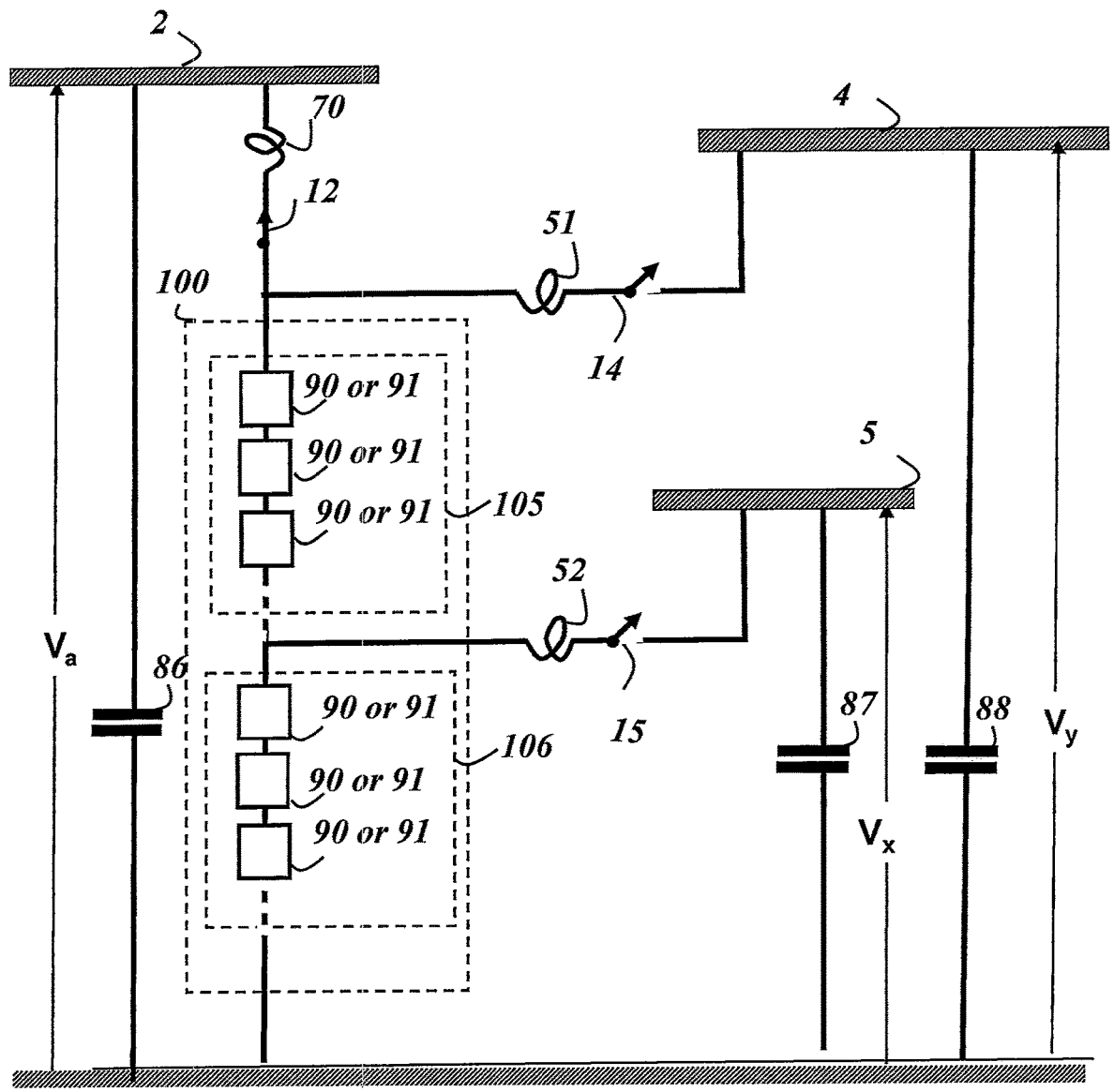
FIG. 22 shows the primary connection of the configuration of FIG. 20 with smoothing capacitors added to provide a smoother output wave form and participate in the resonant charging and discharging.
Figure 23:
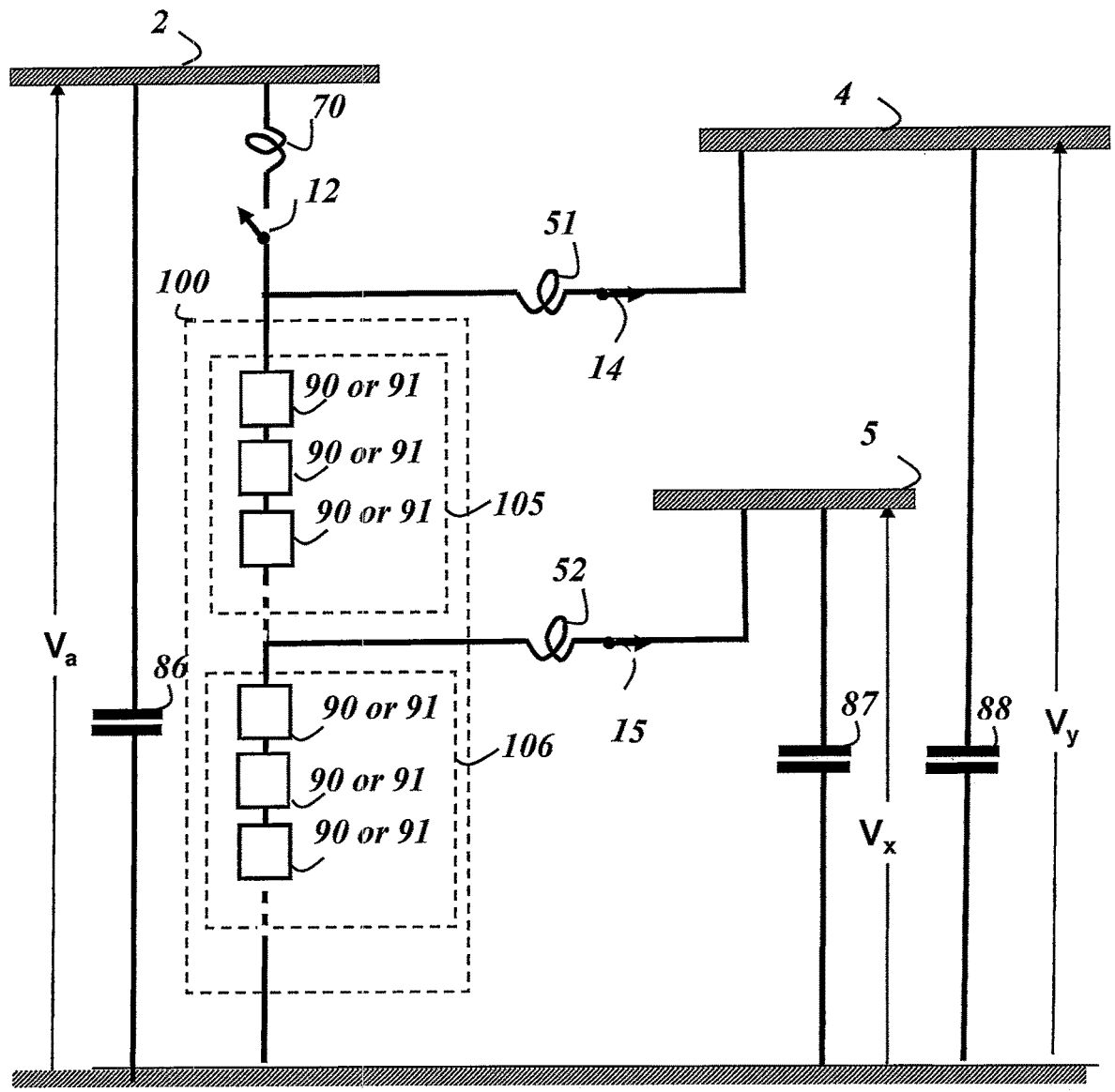
FIG. 23 shows the secondary connections of the configuration of FIG. 21 with smoothing capacitors added to provide a smoother output wave form and participate in the resonant charging and discharging.

An eighth embodiment, illustrated in FIG. 22 in its connection to the primary node 2 and in FIG. 23 in its subsequent connection to the secondary nodes 4, 5, aids in smoothing the current waveform of the seventh embodiment by means of a shunt capacitor 86 on the primary node 2 and/or addition of shunt capacitors 87, 88 on each of the secondary nodes 4 and 5. As these capacitors 88 and 87 participate in the resonant exchanges, they are sized to be dominant in defining the resonant frequency of the secondary circuits for nodes 4 and 5 correspondingly.

Elements of figures are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block.

Examples of the systems and methods described herein comprise computer components and computer-implemented steps that will be apparent to those skilled in the art. For example, it should be understood by one of skill in the art that the computer-implemented steps may be stored as computer-executable instructions on a computer-readable medium such as, for example, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other examples are within the scope of the following claims.

What is claimed is:

1. A computer program product having a non-transitory computer-readable medium including computer program logic encoded thereon that, when executed on a system for transforming the voltage of alternating current (ac) electrical energy between multiple electrical nodes, causes energy exchange between the multiple electrical nodes in a series of discrete increments of time;
   wherein energy transformation is achieved by resonant charge exchange between a first electrical node, a capacitor or series-connected column of capacitors, and a second electrical node, and the computer program product causes the system to repetitively:
   conduct a primary charge exchange by resonantly exchanging energy between the capacitor or the series-connected column of capacitors and the first node; and then
   electrically isolate the capacitor or the series-connected column of capacitors;

during the electrical isolation, electrically reconfigure the series-connected column of capacitors; and then conduct a secondary charge exchange by resonantly exchanging energy between the capacitor or the reconfigured series-connected column of capacitors and the second node;

wherein the series-connected column of capacitors is divided into multiple unequal sections such that, after all sections are charged in series by one node, one or more sections are then reconfigured in voltage opposition to the other sections before connection to another node, to produce a secondary voltage equal to the difference in two section voltages.

2. The computer program product of claim 1, wherein the computer program product further causes the system to determine the manner of capacitor reconfiguration during the interval between primary and secondary charge exchanges.

3. The computer program product of claim 1, wherein the computer program product further causes the system to leave all of the capacitors of the series-connected column of capacitors with equal charge following charge exchange with the secondary node.

4. The computer program product of claim 1, wherein the capacitor or series-connected column of capacitors is sized to allow an input voltage profile and an output voltage profile to differ by its temporary storage of energy.

5. The computer program product of claim 1, further comprising a smoothing capacitor electrically connected between each node and ground, to smooth both input and output waveforms.

6. The computer program product of claim 5, in which the smoothing capacitors also participate in the resonant energy exchange for the input and output waveforms.

7. The computer program product of claim 1, multiple, parallel series-connected columns of capacitors that are controlled to accomplish resonant energy exchange equally offset in time from each other, to produce smoother input and output voltage profiles.

8. The computer program product of claim 1, wherein the series-connected column of capacitors is divided into multiple series-connected sections such that the sections can be charged from a first node in series, after which their series connection can be configured to serve one secondary node and their intermediate connection can be configured to serve another secondary node.

9. The computer program product of claim 1, wherein the computer program product further causes the system to connect a capacitor to affect a resonant energy exchange with a first node, then disconnected and resonantly connected to a larger capacitor, leaving the larger capacitor and the node to which it is connected with a voltage lower than the voltage of the first node.

10. A system for transforming the voltage of alternating current (ac) electrical energy by resonant charge exchange between a first node and a second node, comprising:

a capacitor or series-connected column of capacitors; and a controller that is configured to cause the system to repetitively:

conduct a primary charge exchange by resonantly exchanging energy between the capacitor or the series-connected column of capacitors and the first node; and then electrically isolate the capacitor or the series-connected column of capacitors;

during the electrical isolation, electrically reconfigure the series-connected column of capacitors; and then conduct a secondary charge exchange by resonantly exchanging energy between the capacitor or the reconfigured series-connected column of capacitors and the second node;

wherein the series-connected column of capacitors is divided into multiple unequal sections such that, after all sections are charged in series by one node, one or more sections are then reconfigured in voltage opposition to the other sections before connection to another node, to produce a secondary voltage equal to the difference in two section voltages.

11. The system of claim 10, wherein the controller further causes the system to determine the manner of capacitor reconfiguration during the interval between primary and secondary charge exchanges.

12. The system of claim 10, wherein the controller further causes the system to leave all of the capacitors of the series-connected column of capacitors with equal charge following charge exchange with the secondary node.

13. The system of claim 10, wherein the capacitor or series-connected column of capacitors is sized to allow an input voltage profile and an output voltage profile to differ by its temporary storage of energy.

14. The system of claim 10, further comprising a smoothing capacitor electrically connected between each node and ground, to smooth both input and output waveforms.

15. The system of claim 14, wherein the smoothing capacitors also participate in the resonant energy exchange for the input and output waveforms.

16. The system of claim 10, comprising multiple, parallel series-connected columns of capacitors that are controlled to accomplish resonant energy exchange equally offset in time from each other, to produce smoother input and output voltage profiles.

17. The system of claim 10, wherein the series-connected column of capacitors is divided into multiple series-connected sections such that the sections can be charged from a first node in series, after which their series connection can be configured to serve one secondary node and their intermediate connection can be configured to serve another secondary node.

18. The system of claim 10, wherein the controller further causes the system to connect a capacitor to affect a resonant energy exchange with a first node, then disconnected and resonantly connected to a larger capacitor, leaving the larger capacitor and the node to which it is connected with a voltage lower than the voltage of the first node.

19. An alternating current to alternating current (ac-to-ac) power transformation system that is constructed and arranged to transform power from a first ac voltage node to a separate second ac voltage node, comprising:

a column comprising a plurality of capacitive modules connected in series, each capacitive module comprising a series connected capacitance, where each module is constructed and arranged so as to be capable of electrically inserting its capacitance into the column, or electrically isolating and electrically bypassing its capacitance from the column;

first and second reactors;

first and second switches, wherein the first switch is in series with the first reactor between a first end of the column and the first node, and the second switch is in series with the second reactor between the first end of the column and the second node; and a controller that is adapted to control:

a segmentation of the column into two segments, a first segment with n capacitive modules, where n is an integer number, and a second segment with m capacitive modules that each comprise a full bridge capacitive module, where m is an integer number that is greater than n;

a polarity reversal of a capacitor of each of the m full bridge modules;

the insertion of the capacitances into the column;

the isolation and bypassing of the capacitances from the column; and the states of the first and second switches;

wherein through such control the controller:

charges the first and second segments in series;

repeatedly, sequentially connects the first end of the column to only one of the first and second ac voltage nodes at a time;

reverses a polarity of the second segment during an interval where the first end of the second segment is not connected to either the first node or the second node; and controls the number of capacitances that are isolated and bypassed from the column before its connection to either ac voltage node during such repeated, sequential connection;

wherein the ac-ac power transformation system is constructed and arranged to accomplish an ac voltage transformation of $(m+n)/(m-n)$ between the first and second ac voltage nodes.

* * * * *